(12) United States Patent
DeLauter

(10) Patent No.: US 8,764,040 B1
(45) Date of Patent: Jul. 1, 2014

(54) QUADRICYCLE WITH SUSPENSION

(76) Inventor: Dennis DeLauter, Beaver, PA (US)

( * ) Notice: Subject to any disclaimer, the term of this patent is extended or adjusted under 35 U.S.C. 154(b) by 0 days.

(21) Appl. No.: 13/407,757

(22) Filed: Feb. 28, 2012

Related U.S. Application Data

(60) Provisional application No. 61/447,233, filed on Feb. 28, 2011.

(51) Int. Cl.
*B60G 3/18* (2006.01)
(52) U.S. Cl.
USPC ...... 280/124.135; 280/124.137; 280/124.142; 280/124.147; 280/124.155; 280/267
(58) Field of Classification Search
USPC ............... 280/124.135, 124.134, 124.136, 280/124.147, 124.155, 124.142, 282, 267
See application file for complete search history.

(56) References Cited

U.S. PATENT DOCUMENTS

| | | | | |
|---|---|---|---|---|
| 2,152,938 | A * | 4/1939 | Welch | 280/124.103 |
| 4,360,224 | A | 11/1982 | Sato et al. | |
| 4,465,296 | A * | 8/1984 | Shiratori et al. | 280/124.155 |
| 4,637,274 | A | 1/1987 | Goldenfeld | |
| 4,852,898 | A | 8/1989 | Donoghue et al. | |
| 5,713,590 | A | 2/1998 | Clark | |
| 6,203,043 | B1 * | 3/2001 | Lehman | 280/288.1 |
| 6,286,846 | B1 | 9/2001 | Aparicio et al. | |
| 6,612,593 | B2 * | 9/2003 | Mikasa et al. | 280/86.758 |
| 6,695,329 | B2 * | 2/2004 | Handa | 280/124.135 |
| 6,987,327 | B1 | 1/2006 | Lucatero | |
| 7,017,685 | B2 | 3/2006 | Schoenberg | |
| 7,461,851 | B2 * | 12/2008 | Yamamura et al. | 280/124.135 |
| 7,562,885 | B2 | 7/2009 | Marcacci | |
| 7,648,148 | B1 * | 1/2010 | Mercier | 280/124.103 |
| 7,661,689 | B2 * | 2/2010 | Kinugasa | 280/124.135 |
| 7,896,371 | B2 * | 3/2011 | Matsuura | 280/124.135 |
| 7,934,735 | B2 * | 5/2011 | Kuwabara | 280/124.134 |
| 7,954,835 | B2 * | 6/2011 | Nakamura et al. | 280/124.135 |
| 8,262,111 | B2 * | 9/2012 | Lucas | 280/124.103 |
| 8,317,207 | B2 * | 11/2012 | Mercier | 280/124.103 |
| 2002/0190494 | A1 | 12/2002 | Cocco et al. | |

(Continued)

FOREIGN PATENT DOCUMENTS

GB 2 279 047 A 12/1994

OTHER PUBLICATIONS

Athos quadricycle made by Contes Engineering, http://www.contesengineering.com/athos.html.

(Continued)

*Primary Examiner* — Paul N Dickson
*Assistant Examiner* — Darlene P Condra
(74) *Attorney, Agent, or Firm* — William F. Lang, IV; Lang Patent Law LLC

(57) ABSTRACT

A quadricycle includes a four-wheel suspension system that is structured to maintain contact between the ground and the wheels when traversing uneven terrain, as well as to permit a rider to lean into a curve in order to facilitate steering the vehicle. The suspension assemblies are relatively wide to resist rollover accidents. Shock absorbers within the suspension assemblies are angled from vertical to provide both a vertical force component and a horizontal force component in order to permit leaning into a curve while resisting excessive leaning. The quadricycle's drivetrain is structured to increase clearance between the ground and many drivetrain components. Smaller components of the spindle and wheel hub assembly are protected by larger components of the suspension assembly.

7 Claims, 13 Drawing Sheets

(56) References Cited

U.S. PATENT DOCUMENTS

2006/0066069 A1* 3/2006 Yanai et al. ............ 280/124.135
2007/0029751 A1   2/2007 Marcacci
2007/0176386 A1* 8/2007 Schlangen et al. ..... 280/124.135
2007/0182120 A1* 8/2007 Tonoli et al. ........... 280/124.142
2011/0025012 A1* 2/2011 Nakamura ............. 280/124.135

OTHER PUBLICATIONS

Quike made by Clemson's ME 202 class, http://www.youtube.com/watch?v=rZ1OeO3e9bA.

* cited by examiner

QUADRICYCLE WITH SUSPENSION

CROSS REFERENCE TO RELATED APPLICATION

This application claims the benefit of U.S. provisional patent application Ser. No. 61/447,233, filed on Feb. 28, 2011, and entitled "Pedal-Powered Four Wheel Cycle."

TECHNICAL FIELD

The present invention relates to pedal-powered vehicles. More specifically, a quadricycle having an independent suspension for each wheel is provided.

BACKGROUND INFORMATION

Pedal powered vehicles are well known. Although bicycles are the most common, unicycles, tricycles, and quadricycles have all been built in the past. Such vehicles are currently used for physical fitness, recreation, and transportation.

Concerns about both the price of gasoline, as well as the environment, are expected to result in increased interest in the use of pedal powered vehicles for transportation. Although presently available bicycles are safe and easy to ride on a relatively dry road, slippery conditions such as snow, ice, rain, mud, or gravel can greatly increase the likelihood of a fall. A fall that occurs in traffic could potentially have serious consequences.

A quadricycle would be much safer in slippery conditions than a bicycle. However, when traveling over uneven surfaces, a presently available quadricycle, which typically includes rigid axles, would be unable to maintain contact between all four wheels and the ground at all times. Accordingly, there is a need for a means of maintaining contact between all four wheels of a quadricycle and the ground at all times.

Furthermore, a bicycle has the advantage of steering not only by turning the handlebars, but also by leaning into a turn. Leaning into a turn resists the centrifugal forces which would otherwise tend to cause a vehicle to tip over during a turn. Unfortunately, presently available quadricycles do not provide any means of leaning into a turn.

U.S. Pat. No. 4,360,224 discloses a tricycle having two front wheels and a single rear wheel. The front wheels are connected to the frame through a double wishbone suspension having a pair of upper arms and a pair of lower arms connected by vertical links at their outer ends. The upper arms are pivotally connected to the frame. The lower arms are pivotally connected to a longitudinal shaft by a shock absorbing cushion.

U.S. Pat. No. 6,286,846 discloses a suspension system for isolating a load independently from two separate inputs such as a pair of wheels. The suspension is applicable to two wheeled vehicles, with the inputs being the front and rear wheels of a bicycle.

US 2002/0190494, filed by C. Cocco et al. and published on Dec. 19, 2002, discloses a tricycle having two front wheels and a single rear wheel. The suspension assembly disclosed therein utilizes essentially vertical shock absorbers, within a relatively narrow structure.

A suspension system for a quadricycle is disclosed within US 2007/0029751, filed by M. Marcacci and published on Feb. 8, 2007. This suspension system is designed specifically to avoid steering caused by the rolling of the vehicle, as stated in paragraph [0026], [0029], and [0039] of Marcacci. Conversely, the present inventor believes that utilizing the leaning of the vehicle to affect or assist with steering is advantageous. Furthermore, this suspension system utilizes essentially vertical shock absorbers.

Accordingly, there is a need for a pedal powered vehicle having a suspension system which will permit leaning into a turn while negotiating a curve, while at the same time resisting excessive leaning of the vehicle.

SUMMARY

The above need is met by a quadricycle having a suspension system. The suspension system includes a mount having a central portion pivotally secured to a lower portion of the vehicle's frame. The mount is permitted to pivot with respect to the frame in order to increase the flexibility of the suspension system. A lower arm is pivotally secured to one end of the mount. An upper arm is hingedly secured to and upper portion of the vehicle's frame. A spindle assembly is hingedly secured between the upper and lower arms. A shock absorber extends from either the lower arm or the upper arm to the frame.

Another example of a quadricycle has a suspension system with a mount having a central portion secured to a lower portion of the vehicle's frame. The mount is permitted to pivot with respect to the frame in order to increase the flexibility of the suspension system. A lower arm is pivotally secured to one end of the mount. An upper arm is hingedly secured to and upper portion of the vehicle's frame. A spindle assembly is hingedly secured between the upper and lower arms. A shock absorber extends from either the lower arm or the upper arm to the frame.

The shock absorber is angled with respect to vertical in order to provide force components in both the vertical and horizontal directions.

Yet another example of a quadricycle includes a suspension system having a mount having a central portion pivotally secured to a lower portion of the vehicle's frame. The mount is permitted to pivot with respect to the frame in order to increase the flexibility of the suspension system. A lower arm is pivotally secured to one end of the mount. An upper arm is hingedly secured to and upper portion of the vehicle's frame. A spindle assembly is hingedly secured between the upper and lower arms. A shock absorber extends from the lower arm to the frame.

These and other aspects of the invention will become more apparent through the following description and drawings.

BRIEF DESCRIPTION OF THE DRAWINGS

Like reference characters denote like elements throughout the drawings.

DETAILED DESCRIPTION

Figure 1:
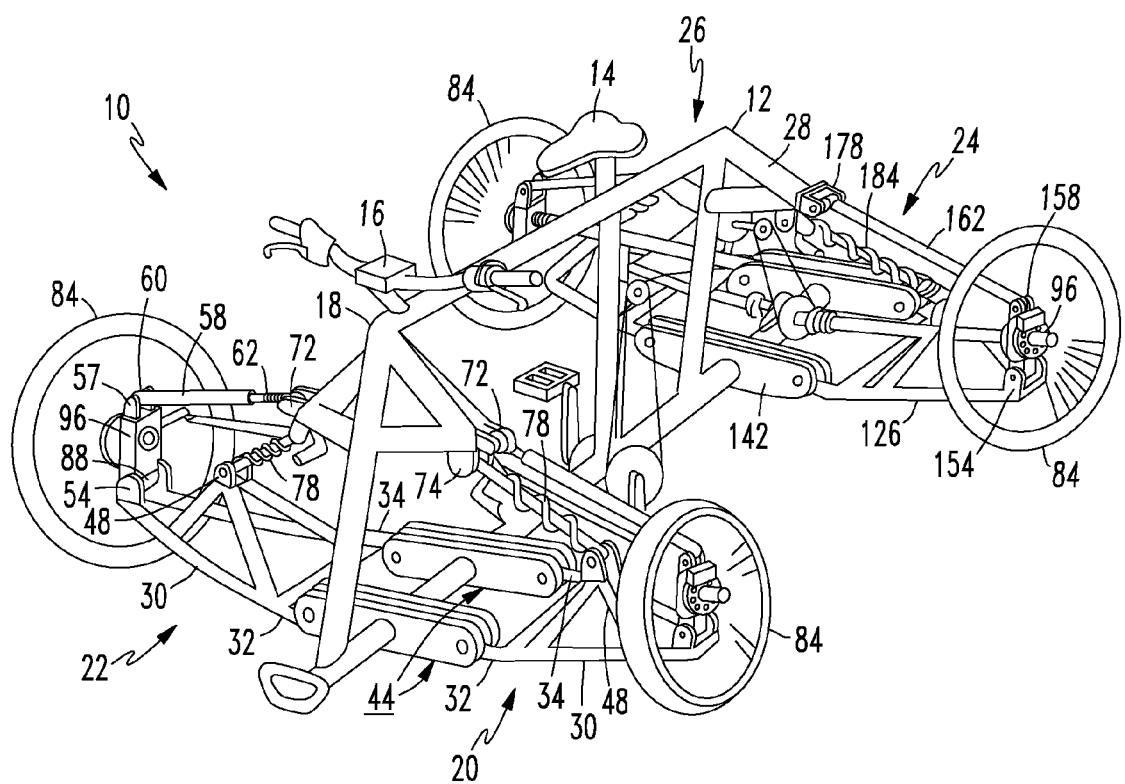
FIG. 1 is an isometric front, left side, and top view of a quadricycle.
Figure 2:
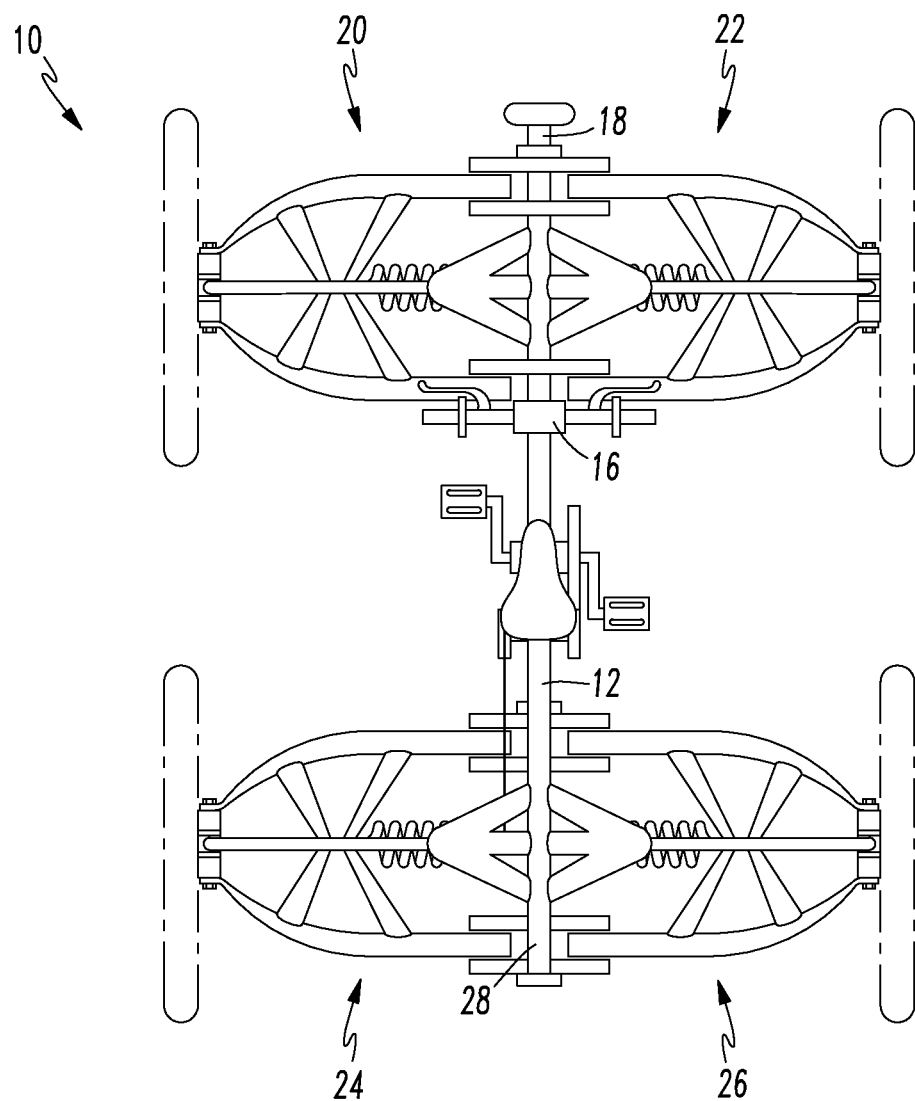
FIG. 2 is a top plan view of the quadricycle of FIG. 1.
Figure 3:
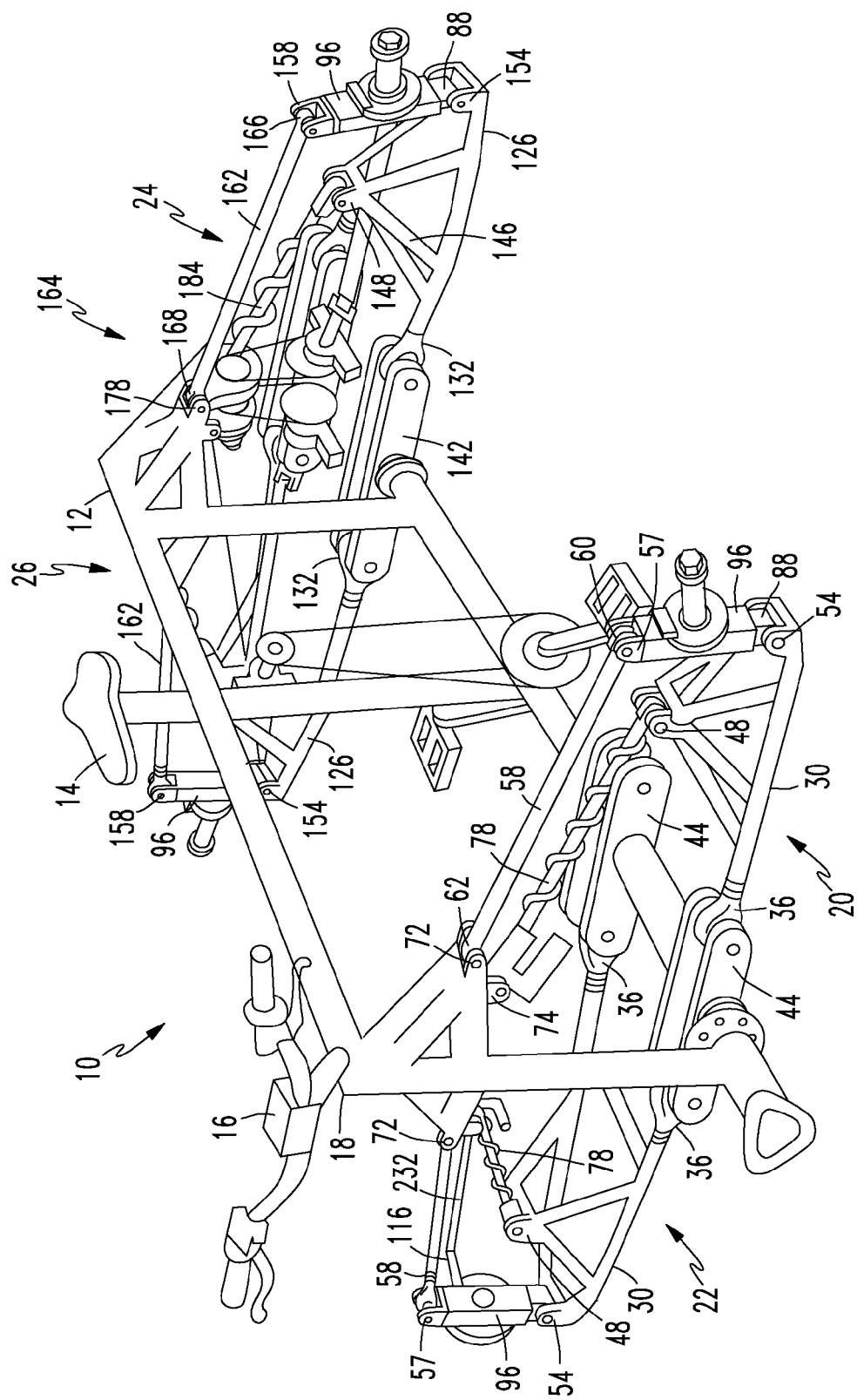
FIG. 3 is an isometric front, left side, and top view of a quadricycle having the wheels removed for clarity.

Referring to FIGS. 1-3, a quadricycle 10 is shown. The quadricycle 10 includes a frame 1. A seat 14 is secured to and upper portion of the frame 12 in a manner that may provide for height adjustment in a manner that is well known to those skilled in the art of pedal vehicles. A handlebar assembly 16 is pivotally secured within a forward portion 18 of the frame 12. A left front suspension assembly 20 and right front suspension assembly 22 are hingedly secured to the forward portion 18 of the frame 12 in a manner that will be explained in greater detail below. Similarly, a left rear suspension assembly 24 and right rear suspension assembly 26 are hingedly secured to a rear portion 28 of the frame 12, in a manner that will be explained in greater detail below.

Figure 4:
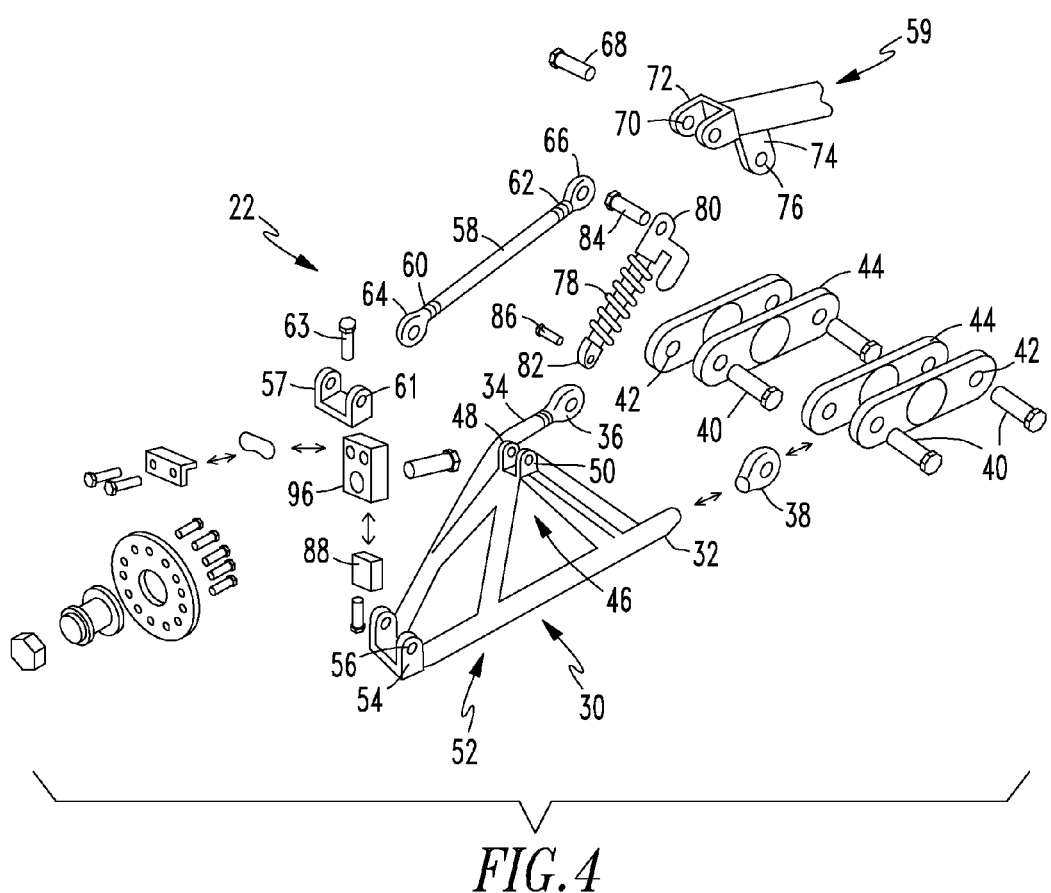
FIG. 4 is an isometric front, right side, and top exploded view of the right front suspension assembly of the quadricycle of FIG. 1.

Referring to FIG. 4, the individual components of the right front suspension assembly 22, which is a mirror image of the left front suspension assembly 24, are shown. This suspension assembly 22 includes a lower arm 30. The illustrated example of the lower arm 30 is an A-arm 30 which is generally triangular when viewed from the front, having a forward inner corner 32 and rear inner corner 34. Each of the inner corners 32, 34 include a hinge connector element 36, which in the illustrated example is a ball joint rod end 36 having a threaded portion 38 that is structured to interface with a corresponding threaded portion of the inner corners 32, 34. The ball joint rod end 36 further includes an aperture 38 that is structured to receive a pin 40, which also passes through at least one corresponding aperture 42 defined within the mount 44, which is secured to a lower portion of the forward portion 18 of the frame 12. Some examples of the mount 44 may pivot with respect to the frame 12, while other examples of the mount 44 are rigid with respect to the frame 12. The threaded connection between the ball joint rod end 36 and corners 32, 34 permits some adjustment to the length of this portion of the A-arm 30.

The upper portion 46 of the A-arm 30 includes a bracket 48 defining at least one aperture 50 therein. Similarly, the outer corner 52 of the A-arm 30 includes a similar bracket 54, defining at least one aperture 56 therein. A base 88 and spindle 96, described in more detail below, are secured within the bracket 54. A bracket 57 defining aperture 61 therein is secured to the top of the spindle 96.

A control arm 58 is structured to connect the bracket 57 and upper portion 59 of the forward portion 18 of the frame 12. The illustrated example of the control arm 58 includes a pair of threadedly connected ball joint rod ends 60, 62, each of which defines an aperture 64, 66, respectively. The threaded connection between the control rod 58 and the ball joint rod ends 60, 62 permits some adjustments to the length of the assembly formed by these components, thereby permitting the tilt of a wheel 84 to be adjusted. The ball joint rod end 60 is connected to the bracket 57 by a pin 63 passing through the corresponding apertures 64, 61. Similarly, the ball joint rod end 62 is connected by a pin 68 passing through the apertures 66 as well as at least one corresponding aperture 70 defined within a bracket 72 that is secured to the upper portion 59 of the forward frame portion 18. The upper portion 59 includes a second bracket 74 defining an aperture 76. A shock absorber 78 defines an aperture 80, 82 at each end. In the illustrated example, the shock absorber 78 is a gas shock, incorporating both a spring and an adjustable gas system. The shock absorber 78 is secured between the upper front frame portion 59 and upper A-arm portion 46 by a pin 84 passing through the corresponding apertures 76, 80, as well as the pin 86 passing through the corresponding apertures 82, 50. The shock absorber 78 serves to bias the A-arm 30 downward. The angle at which the shock absorber 78 is mounted is such that the shock absorber provides both vertical and horizontal force components, with a significant horizontal force component for resisting excessive lean of the quadricycle 10. Some examples of the shock absorber 78 will be mounted at least about 15° from vertical, or in other examples at least about 30° from vertical. Other examples of the shock absorber 78 will be mounted at least about 45° from vertical. The illustrated examples do not exceed about 75° from vertical, or in other examples about 60° from vertical in order to provide a vertical force component.

Figure 5:
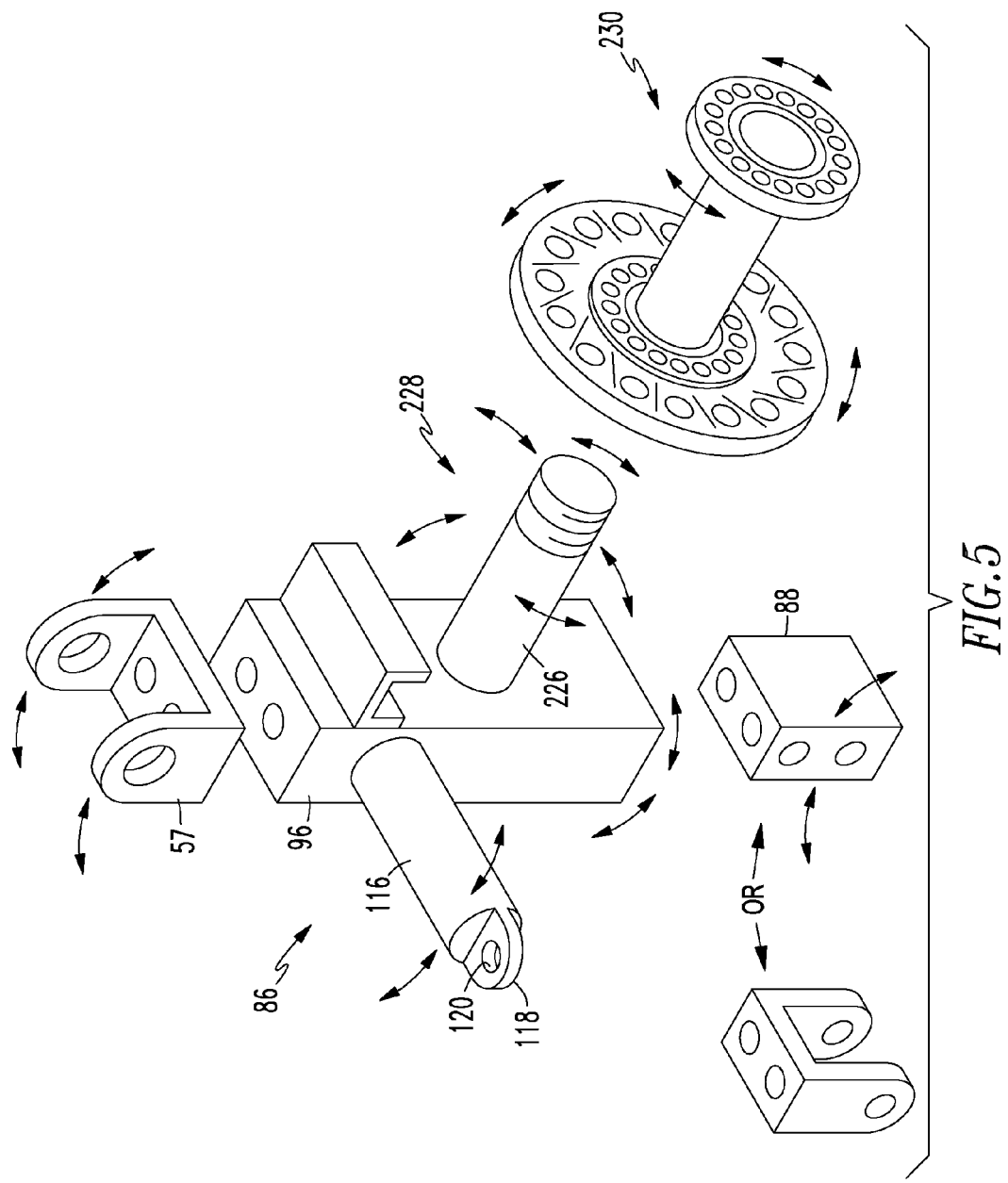
FIG. 5 is an isometric front, left side, and top partially exploded view of a wheel hub assembly for a quadricycle of FIG. 1.
Figure 6:
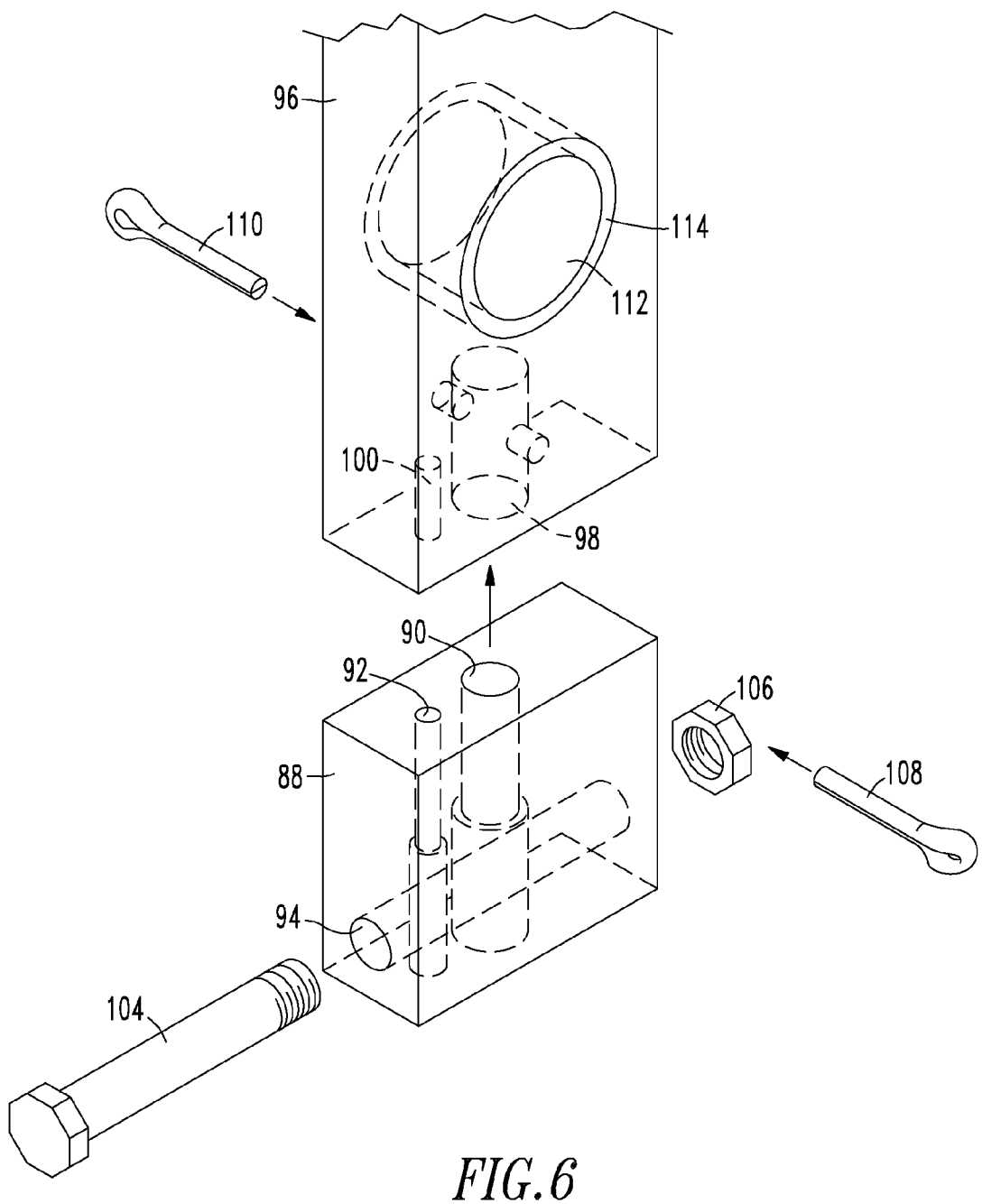
FIG. 6 is an isometric view of a spindle assembly of the quadricycle of FIG. 1.

A wheel 84 is rotatably secured to the right front suspension assembly 22 utilizing the wheel hub and spindle assembly 86 which is best illustrated in FIGS. 5-6. The assembly 86 includes a base 88 which is pivotally secured within the bracket 54. Referring specifically to FIG. 6, the base 88 defines a central vertical hole 90, and offset vertical hole 92, and a horizontal hole 94 intersecting the holes 90 and 92. The spindle 96 is secured on top of the base 88. The spindle 96 includes a central threaded hole 98 and an offset threaded hole 100 defined within the bottom surface 102. In the case of a front wheel hub assembly, a bolt 90 is inserted upward into the central holes 90, 98 to pivotally secure the spindle 96 with respect to the base 88. In the case of a rear wheel, a second bolt is inserted upward through the offset holes 92, 100, so that the bolts contained within the central holes 90, 98, combined with the bolts secured within the offset holes 92, 100, resist fitting of the spindle 96 with respect to the base 88. In either case, a bolt 104 is secured within the horizontal hole 94 by the nut 106 and/or pin 108. The bolt 104 not only secures the base 88 to the bracket 54, but also acts as a barrier to resist loosening of the bolts within the holes 90, 92. A bolt passing into the central hole 98 may further be secured by a pin 110.

Referring back to FIGS. 6-7, the spindle 96 includes an axle receiving hole 112, which in the illustrated example includes a bearing 114 therein. A spindle 96 utilized in conjunction with the front wheels also includes a rod 116 protruding from one side, which will be utilized in steering the quadricycle as explained in greater detail below. The illustrated example of the rod 116 includes an attachment flange 118 defining a hole 120 therein. A bracket 57 is secured to the top of the spindle 96. Because the spindle assembly 86 is located above the A-arm 30, these components are protected by the solid structure of the A-arm 30.

Figure 8:
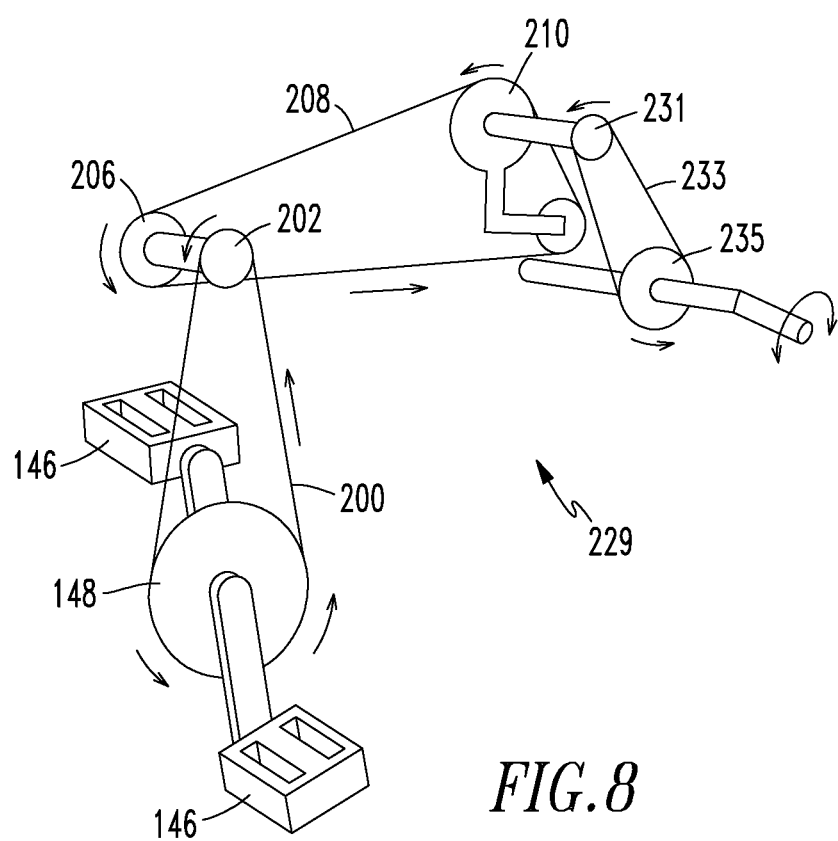
FIG. 8 is an isometric front, left side, and top view of a drivetrain of the quadricycle of FIG. 3.
Figure 9:
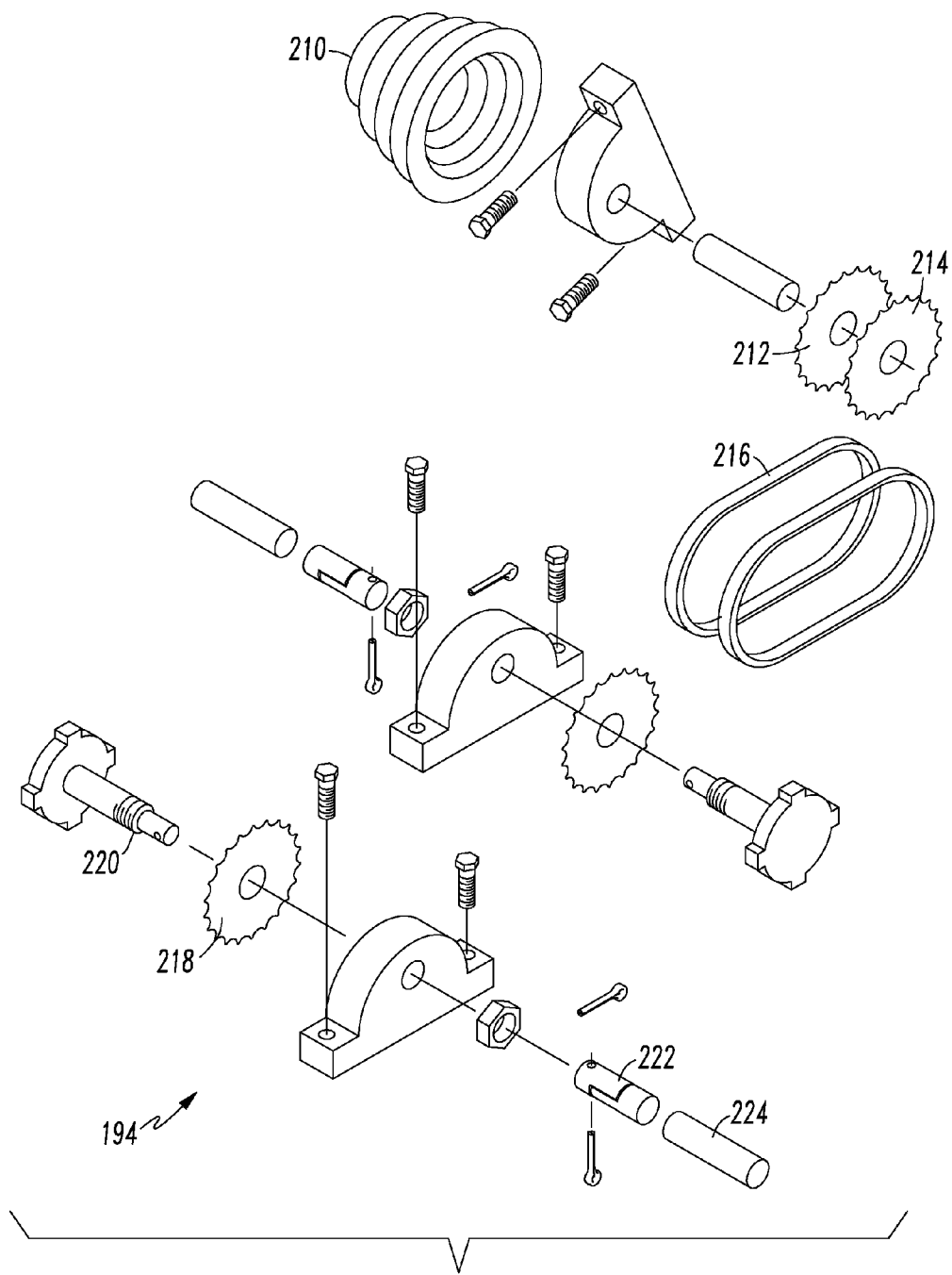
FIG. 9 is an isometric front, left side, and top exploded view of a differential assembly for a drivetrain of FIGS. 7-8.

Referring to FIGS. 3 and 8, the individual components of the left rear suspension assembly 24, which is a mirror image of the right rear suspension assembly 26, are shown. Some elements of the left rear suspension assembly 24 have been omitted from FIG. 8 for clarity in illustrating the drivetrain, which is described below. The suspension assembly 24 includes a lower arm 126. The illustrated example of the lower arm 126 is an A-arm 126 which is generally triangular when viewed from the front, having a forward inner corner 128 and rear inner corner 130. Each of the inner corners 128,130 include a hinge connector element 132, which in the illustrated example is a ball joint rod end 132 having a threaded portion 134 that is structured to interface with a corresponding threaded portion of the inner corners 128, 130. The ball joint rod end 132 further includes an aperture 136 that is structured to receive a pin 138, which also passes through at least one corresponding aperture 140 defined within the mount 142, which is secured to a lower portion 144 of the rear portion 28 of the frame 12. Some examples of the mount 142 may pivot with respect to the frame 12, while other examples of the mount 142 are rigid with respect to the frame 12. The threaded connection between the ball joint rod end 132 and corners 128, 132 permits some adjustment to the length of this portion of the A-arm 126.

The upper portion 146 of the A-arm 126 includes a bracket 148 defining at least one aperture 150 therein. Similarly, the outer corner 152 of the A-arm 126 includes a similar bracket 154, defining at least one aperture 156 therein. A base 88 and spindle 96 are secured within the bracket 154 in the same manner as described above, in a manner that resists pivoting of the spindle 96 with respect to the base 88. A bracket 158 defining an aperture 160 therein is secured to the top of the spindle 96.

A control arm 162 is structured to connect the bracket 158 and upper portion 164 of the rear portion 28 of the frame 12. The illustrated example of the control arm 162 includes a pair of threadedly connected ball joint rod ends 166, 168 each of which defines an aperture 170, 171, respectively. The threaded connection between the control rod 162 and the ball joint rod ends 166, 168 permits some adjustments to the length of the assembly formed by these components, thereby permitting the tilt of a wheel 84 to be adjusted. The ball joint rod end 166 is connected to the bracket 158 by a pin 172 passing through the corresponding apertures 160, 170. Similarly, the ball joint rod end 168 is connected by a pin 174 passing through the aperture 171 as well as at least one corresponding aperture 176 defined within a bracket 178 that is secured to the upper portion 164 of the rear frame portion 28. The upper rear portion 164 includes a second bracket 180 defining an aperture 182. A shock absorber 184 defines an aperture 186, 188 at each end. In the illustrated example, the shock absorber 184 is a gas shock, incorporating both a spring and an adjustable gas system. The shock absorber 184 is secured between the upper rear frame portion 164 and upper A-arm portion 146 by a pin 190 passing through the corresponding apertures 186, 182, as well as the pin 192 passing through the corresponding apertures 150. The shock absorber 184 serves to bias the A-arm downward. Some examples of the shock absorber 184 will be mounted at least about 15° from vertical, or in other examples at least about 30° from vertical. Other examples of the shock absorber 184 will be mounted at least about 45° from vertical. The illustrated examples do not exceed about 75° from vertical, or in other examples about 60° from vertical in order to provide a vertical force component.

Figure 7:
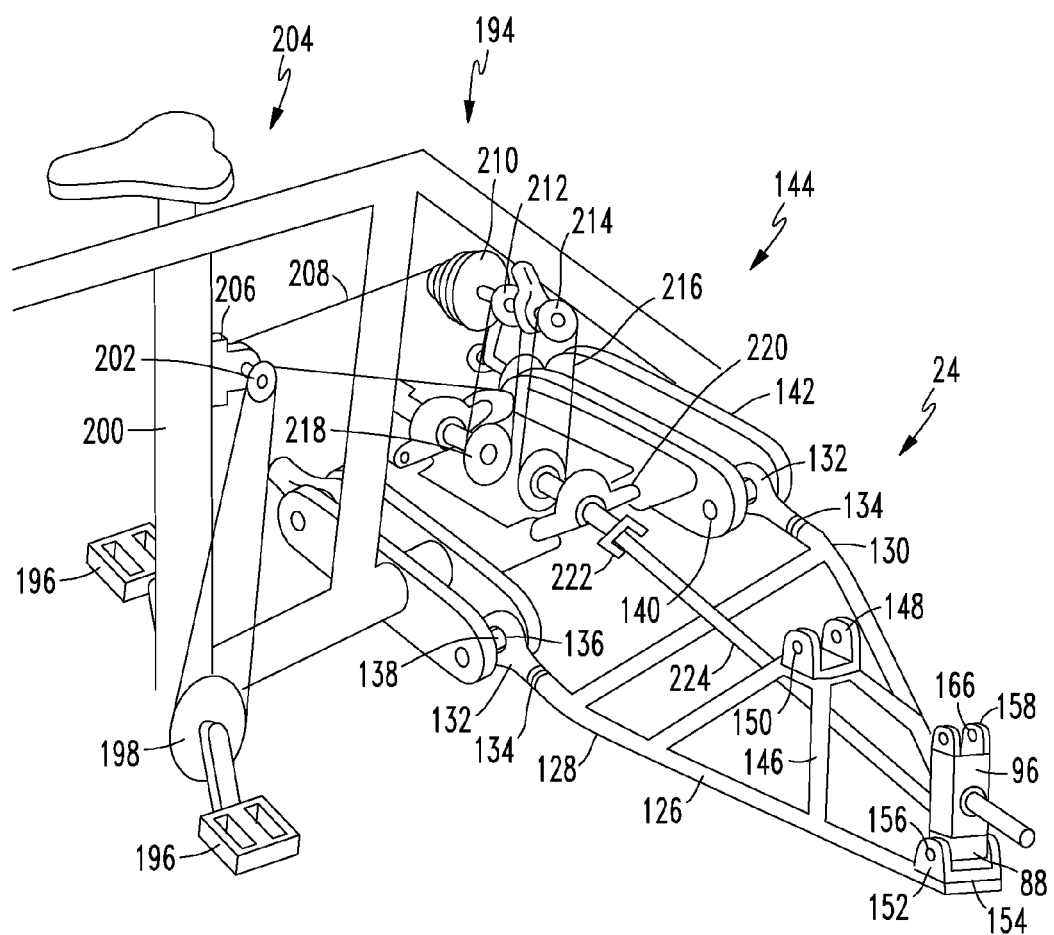
FIG. 7 is an isometric front, left side, and top view of a drivetrain and left rear suspension assembly of the quadricycle of FIG. 1.

Referring back to FIG. 7 as well as FIG. 8, a drivetrain 194 is shown. The drivetrain 194 begins with a conventional set of pedals 196 connected coaxially with at least one sprocket 198. The sprocket 198 is connected by a chain 200 to a second sprocket 202 that is rotatably mounted in an upper portion 204 of the middle of the frame 12. The second sprocket 202 is mounted coaxially with a third sprocket 206 that may have the same or a different diameter. The third sprocket 206 is connected by a chain 208 to a cassette 210 formed from a group of coaxially mounted sprockets in conjunction with a gear shifting mechanism located in the upper rear portion 164 of the frame 12. Gear shifting mechanisms are well known to those skilled in the art of pedal powered vehicles. The cassette 210 is coaxially connected to a right side initial drive sprocket 212 and a left side initial drive sprocket 214. FIG. 7 illustrates the left side of the drive mechanism, which is a mirror image of the right side of the drive mechanism. A chain 216 connects the left side initial drive sprocket 214 to a fifth sprocket 218 that is rotatably mounted in the rear lower portion 144 of the frame 12.

Sprocket 218 is connected to one end of a first drive shaft portion 220. The other end of the first drive shaft portion 220 includes a universal joint 222, to which a second drive shaft portion to 224 is connected. The second drive shaft portion 224 terminates near the spindle 96, where it is connected by another universal joint to a third drive shaft portion 226. The third drive shaft portion 226 passes through the bearing 114 within the spindle 96, terminating in a one-way ratcheting mechanism 228. A hub assembly 230 is connected to the ratcheting mechanism 228. The one-way ratcheting mechanism 228 permits the hub assembly 230 and wheel 84 thereon to be driven by the third drive shaft portion 226 when the pedals 196 are operated, and also allows the wheel 84 to spin freely while coasting.

The drivetrain 229 of FIG. 8 is very similar to the drivetrain 194, differing primarily in that the right/left sprockets 212, 214 and associated chains are replaced with a single upper sprocket 231, chain 233, and lower sprocket 235.

The steering mechanism is best illustrated in FIG. 3 and. For each of the front suspension assemblies 20, 22, the flange 118 of the rod 116 of the spindle 96 is operatively connected to a rod 232, the opposite end of which is operatively connected to the handlebar assembly 16. Turning the handlebars causes the rods 232 to rotate the spindles and 96 in the appropriate direction. The handlebar assembly 16 may further include gear shifting levers in a manner well known to those skilled in the art.

Figure 10:
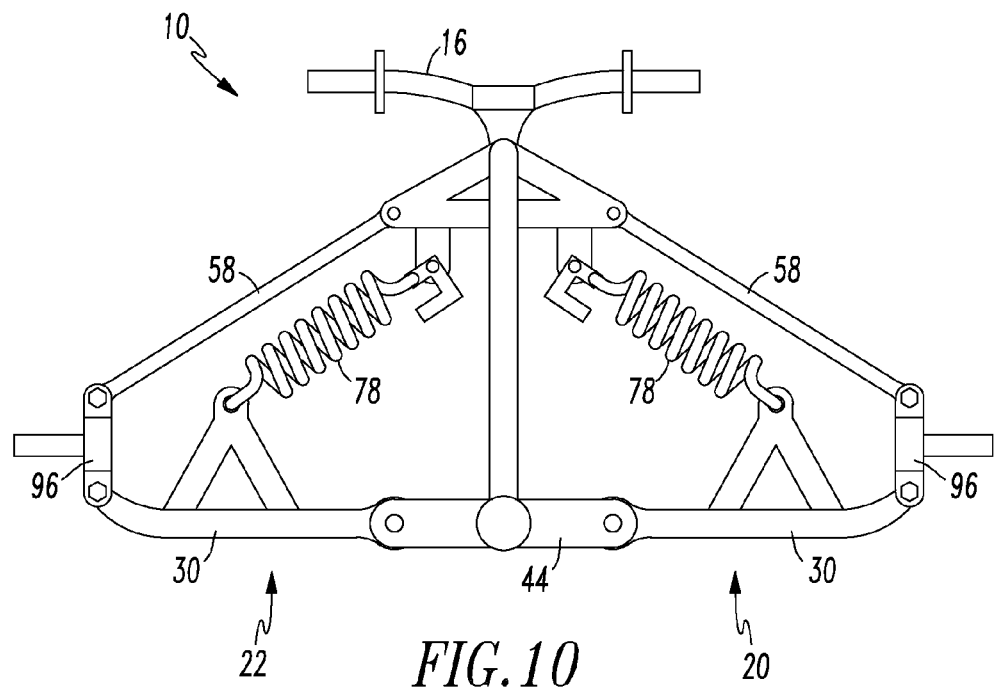
FIG. 10 is a front plan view of the right and the left front suspension assemblies of a quadricycle of FIG. 1, showing the positioning of the parts while traveling in a straight line.
Figure 11:
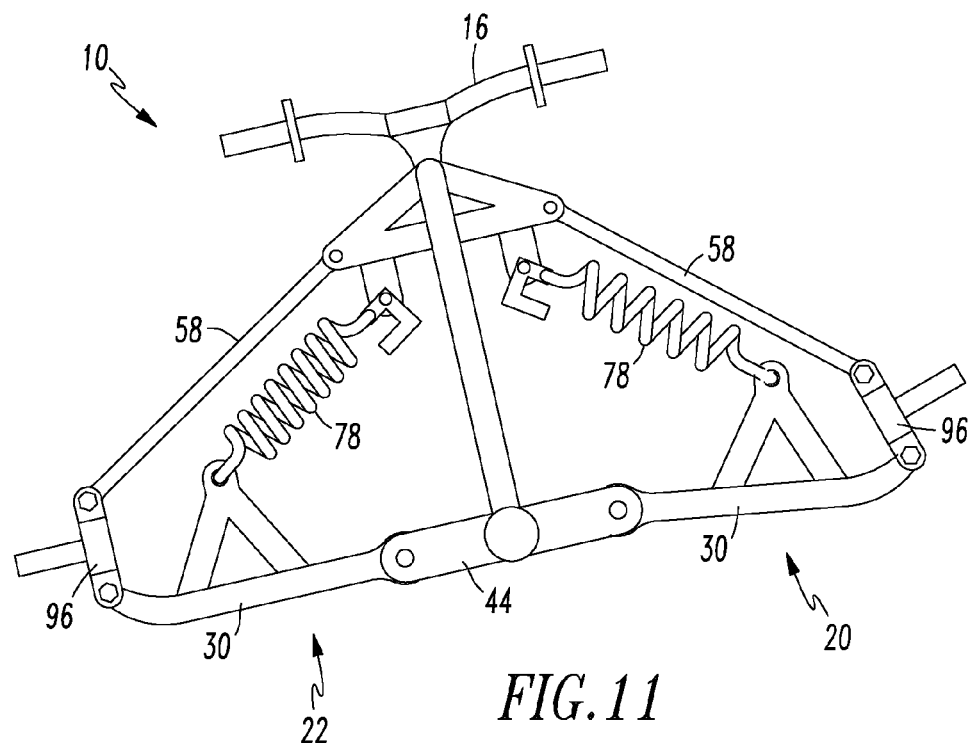
FIG. 11 is a front plan view of the right and the left front suspension assemblies of a quadricycle of FIG. 1, showing the positioning of the parts while traveling around a curve to the right.

FIGS. 10-11 illustrate the working of the suspension system. FIG. 10 depicts the components of the suspension system as the quadricycle 10 is traveling in a straight line. During linear travel, both the right and left A-arms are generally horizontal, with both the right and left shock absorbers being essentially the same length. As the quadricycle 10 negotiates a right-hand curve, shown in FIG. 11, the rider may lean to the right to aid in negotiating the curve. This leaning causes the right side suspension assembly to pivot upward, and the left side suspension assembly to pivot downward. This leaning also causes the wheels 84 to lean, so that the quadricycle is riding at least partially on the side edges of the wheels, thereby causing the natural rotation of the wheels to aid in negotiating the right side turn. This leaning further positions the quadricycle and rider in a more stable position with respect to the centrifugal forces generated by negotiating the curve.

Figure 14:
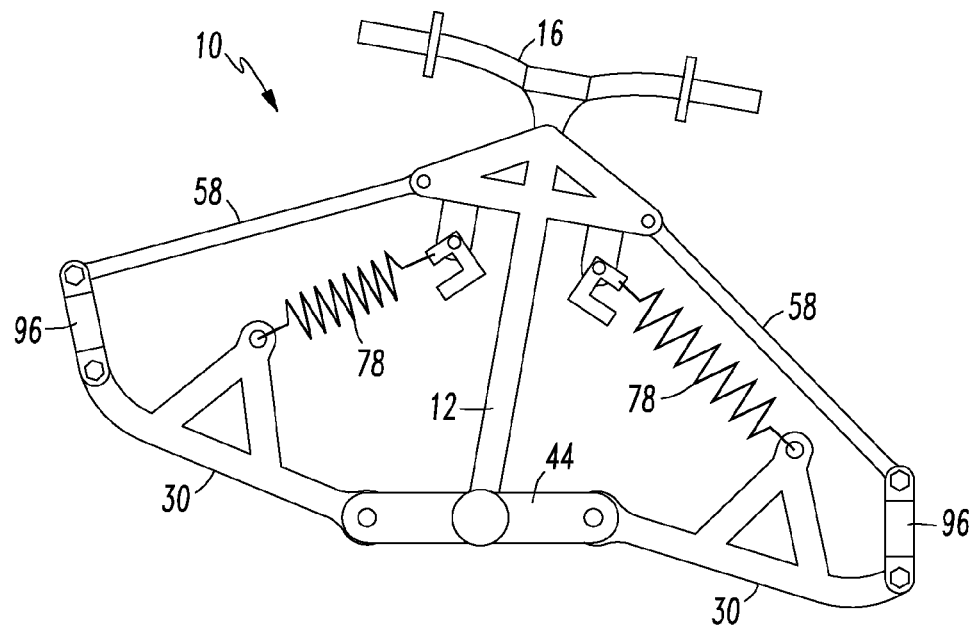
FIG. 14 is a front plan view of the right and the left front suspension assemblies of a quadricycle of FIG. 1, showing the positioning of the parts while traveling around a curve to the left.
Figure 15:
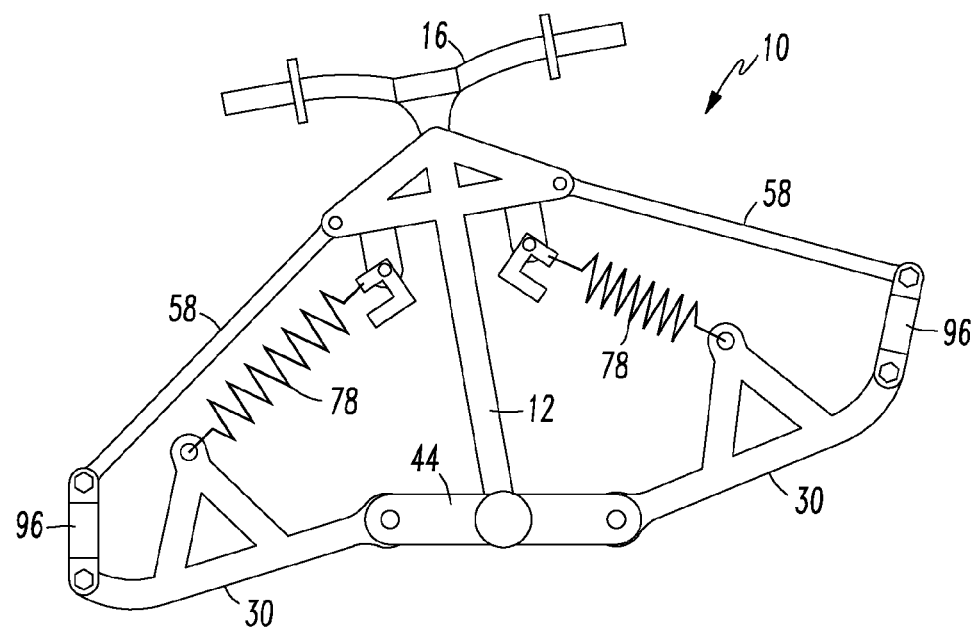
FIG. 15 is a front plan view of the right front and the left front suspension assemblies of a quadricycle of FIG. 1, showing the positioning of the parts while traveling around a curve to the right.

FIGS. 14-15 illustrate negotiating a curve utilizing in embodiment of the quadricycle 10 having mounts 44, 142 that are pivotally mounted to the frame. In each of FIGS. 14-15, the mounts 44, 142 have remained substantially horizontal even though the frame 12 is leaning to one side in order to lean into a curve. Depending on the terrain, the mounts 44, 142 may remain substantially horizontal, or they may assume other orientations as best suits the movement of the quadricycle 10.

The configuration of the drivetrain further assists the ability of the quadricycle 10 to negotiate curves and various terrain irregularities. By placing many of the components of the drivetrain relatively high on the frame, any danger of striking the ground with these components is reduced. Furthermore, the various universal joints connecting the drive shaft sections permit the drive shaft sections to move in a manner that delivers power to the wheels 84 while resisting any interference to the movement of the suspension assemblies.

Figure 12:
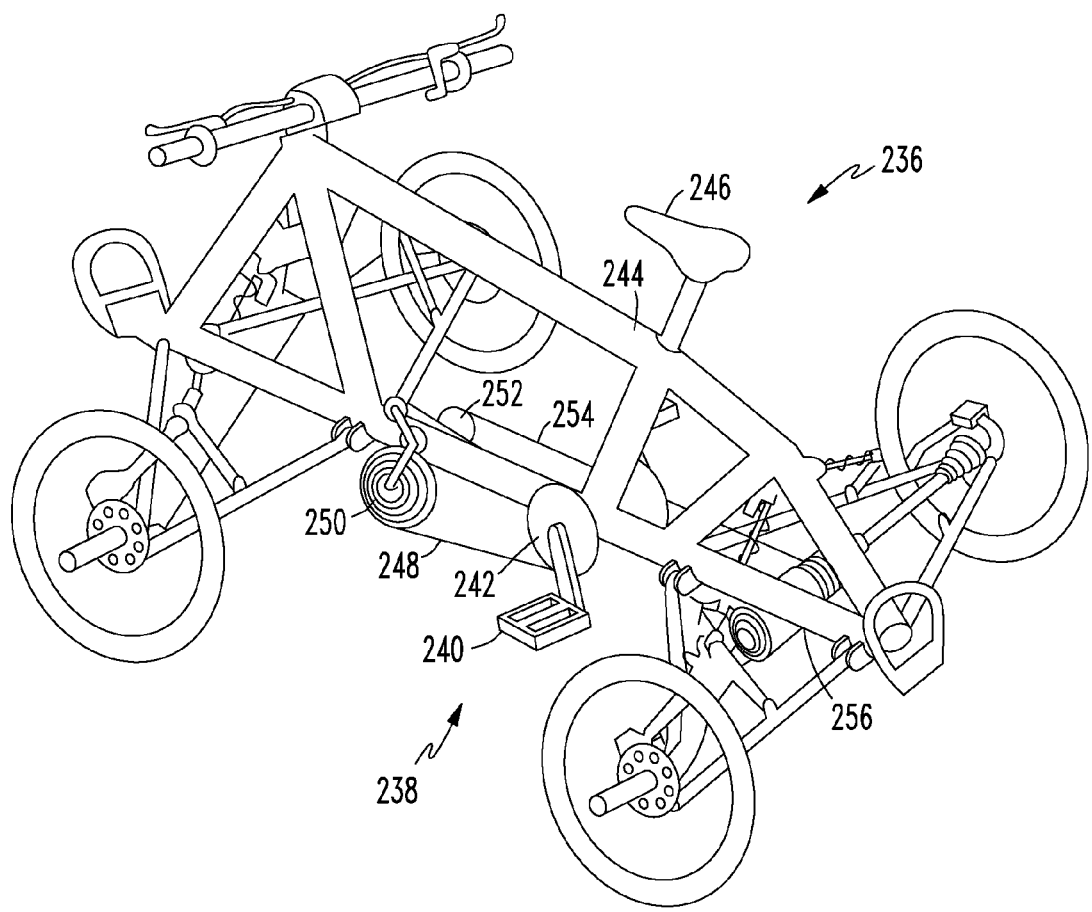
FIG. 12 is a left side, top, and rear isometric view of an alternative quadricycle.

A quadricycle 236 having a modified drivetrain 238 is illustrated in FIG. 12. The pedals 240 and associated sprocket 242 remain in a relatively standard position on the frame 244 relative to the seat 246. A chain 248 extends forward from the sprocket 242 to a cassette 250. The cassette 250 is coaxial with a sprocket 252. A chain 254 carries the power from the sprocket 252 to a rear sprocket 256. A driveshaft arrangement similar to that described above extends from the sprocket 256 to the wheels 84.

Figure 13:
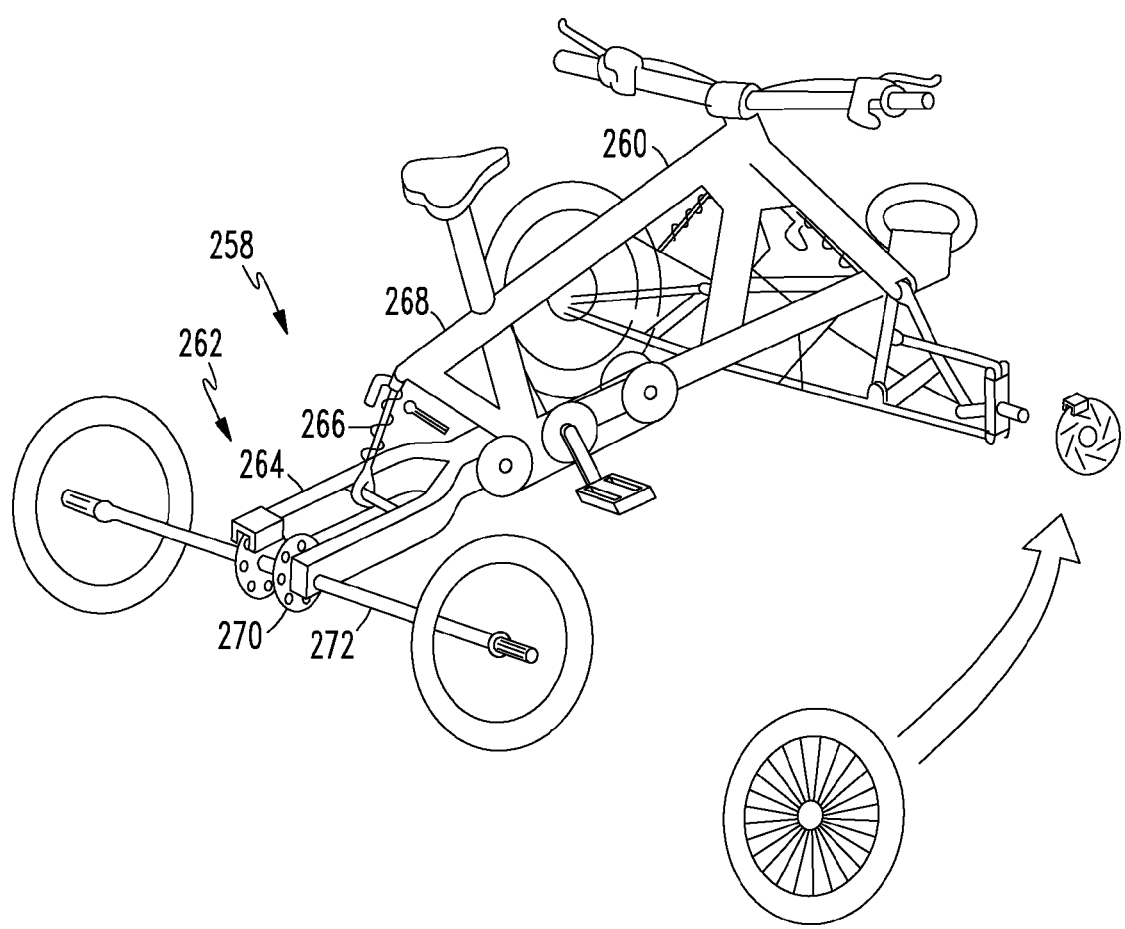
FIG. 13 is a right side, top, and rear isometric view of yet another alternative quadricycle.

A quadricycle 258 having a modified rear suspension assembly is illustrated in FIG. 13. The frame 260 of the quadricycle 258 includes a rear suspension assembly 262. The rear suspension assembly includes an arm 264 pivotally secured to the frame to 60, and extending rearward from the frame 260. The illustrated example of the arm 264 as the general configuration of a two-pronged fork. A shock absorber 266 is connected between the arm 264 and an upper rear portion of the frame 268. A drivetrain sprocket 270 is coaxially mounted on a solid driveshaft 272 that is rotatably secured at the rearward end of the arm 264.

The quadricycle described above therefore provides a suspension system for maintaining contact between the wheels and the ground when negotiating uneven terrain, and to permit leaning into a turn when negotiating curves. The shock absorbers are angled from vertical to provide both vertical and horizontal force components to permit leaning into a curve while resisting excessive leaning. The width of the suspension assemblies resists rollovers, improving safety in snow, ice, wet roads, mud, and/or gravel. Drivetrain elements are elevated from the ground for better protection. Spindle elements are protected by larger suspension assembly components.

A variety of modifications to the above-described embodiments will be apparent to those skilled in the art from this disclosure. For example, any of the various hinge components could be reversed. Furthermore, a gear shifting cassette can be included at any point within a drivetrain. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A suspension system for a vehicle, the vehicle having a frame, the suspension assembly comprising:
    a mount having a pair of ends and a central portion, the central portion being secured to a lower portion of the frame;
    a lower arm having a proximal end and a distal end, the lower arm's proximal end being pivotally secured to one end of the mount, the lower arm having an upper portion having a bracket secured thereto, the upper portion being structured to permit substantially linear passage of a drive shaft therebelow
    a spindle assembly that is hingedly secured to the distal end of the lower arm, the spindle assembly being structured to receive a wheel hub shaft therein;
    an upper arm having a distal end and a proximal end, the upper arm's distal end being hingedly secured to the spindle assembly, the upper arm's proximal end being hingedly secured to an upper portion of the frame; and
    a shock absorber having a lower end and an upper end, the shock absorber's lower end being pivotally secured to the bracket secured to the top of the upper portion of the lower arm;
    the shock absorber's upper end being pivotally secured to the frame.

2. The suspension system according to claim 1, wherein the hinged connection between the spindle and lower arm is disposed above the distal end of the lower arm.

3. The suspension system according to claim 1, wherein the central portion of the mount is pivotally secured to the frame.

4. The suspension system according to claim 3, wherein the mount pivots with respect to the frame within a plane substantially parallel to a plane within which the upper arm and lower arm pivot with respect to the frame.

5. A suspension system for a vehicle, the vehicle having a frame, the suspension assembly comprising:
    a mount having a pair of ends and a central portion, the central portion being pivotally secured to a lower portion of the frame;
    a lower arm having a proximal end and a distal end, the lower arm's proximal end being pivotally secured to one end of the mount, the lower arm having an upper portion having a bracket secured thereto, the upper portion being structured to permit substantially linear passage of a drive shaft therebelow;
    a spindle assembly that is hingedly secured to the distal end of the lower arm, the spindle assembly being structured to receive a wheel hub shaft therein;
    an upper arm having a distal end and a proximal end, the upper arm's distal end being hingedly secured to the spindle assembly, the upper arm's proximal end being hingedly secured to an upper portion of the frame;
    at least one of the lower arm and the upper arm being adjustable in length; and
    a shock absorber having a lower end and an upper end, the shock absorber's lower end being pivotally secured to the bracket secured to the top of the upper portion of the lower arm, the shock absorber's upper end being pivotally secured to the frame;
    whereby an angle with respect to vertical of a wheel secured to the spindle assembly may be adjusted by adjusting the length of either the upper arm or lower arm.

6. The suspension system according to claim 5, wherein the central portion of the mount is pivotally secured to the frame.

7. The suspension system according to claim 6, wherein the mount pivots with respect to the frame within a plane substantially parallel to a plane within which the upper arm and lower arm pivot with respect to the frame.

* * * * *